United States Patent [19]

Bellisio et al.

[11] Patent Number: 4,491,953
[45] Date of Patent: Jan. 1, 1985

[54] DUAL MODE CODING

[75] Inventors: Jules A. Bellisio, Wall Township, Monmouth County; Arthur B. Larsen, Colts Neck, both of N.J.

[73] Assignee: AT&T Bell Laboratories, Murray Hill, N.J.

[21] Appl. No.: 416,380

[22] Filed: Sep. 9, 1982

[51] Int. Cl.³ .............................................. H03K 13/22
[52] U.S. Cl. ........................................ 375/27; 375/31; 381/29; 358/135
[58] Field of Search ........................ 375/26, 27, 31, 34, 375/25; 340/347 AD; 381/29–33, 34–40; 358/135, 136, 260, 133

[56] References Cited

U.S. PATENT DOCUMENTS 3,403,226 9/1968 Wintringham ..................... 375/27 X
3,439,753 4/1969 Mounts et al. ...................... 358/135
4,369,463 1/1983 Anastassiou et al. ................ 358/135

OTHER PUBLICATIONS

Tescher, Andrew G., Richard V. Cox; "Image Coding: Variable Rate Differential Pulse Code Modulation Through Fixed Rate Channel"; SPIE vol. 119 *Application of Digital Image Processing (IOCC 1977).*

Primary Examiner—Robert L. Griffin
Assistant Examiner—Timothy K. Greer
Attorney, Agent, or Firm—David R. Padnes

[57] ABSTRACT

A dual mode encoding/decoding technique for use in digital systems wherein transmitted digital words are limited, on average, to an allotted number of bits. The transmitted digital words are coded into first and second modes. The first coding mode utilizes predictive differential coding to provide a precision which can be greater than that obtainable by coding information solely with the allotted number of bits, while the second mode assures at least a minimum precision for the allotted number of bits. The first coding mode is transmitted as long as a preselected precision is provided. If not, the second coding mode is transmitted. In the disclosed embodiment, the dual mode encoding/decoding technique is applied to the transmission of color video signals.

18 Claims, 2 Drawing Figures

DUAL MODE CODING

TECHNICAL FIELD

The present invention relates to digital transmission systems and, more particularly, to a dual mode encoding/decoding arrangement.

BACKGROUND OF THE INVENTION

Digital communications systems transmit information originating from an analog or digital signal source. In either event, the information is typically coded into digital words for transmission through a digital facility. The digital words, on average, cannot exceed an allotted number of bits. The allotted number of bits is dependent on a number of factors, such as the digital transmission format and/or the facility channel capacity.

The coding of information into digital words having the allotted number of bits provides a certain precision. In many system applications, however, the precision desired corresponds to the coding of all digital words with more than the allotted number of bits. One example of this situation arises in the digital transmission of video signals.

One prior art approach to reduce the number of bits per digital word for a given precision is to utilize predictive differential coding. In predictive differential coding, the difference between the information to be transmitted and a prediction of this information is coded. When the difference is small, the difference can be accurately represented by a small number of bits. However, large differences cannot be accurately represented by a small number of bits. Therefore, the problem with predictive differential coding is that the precision provided varies with the accuracy of the prediction.

SUMMARY OF THE INVENTION

In accordance with the present invention, a dual mode encoding/decoding arrangement is proposed for digital systems wherein information is transmitted as digital words which, on average, are limited to an allotted number of bits. The first coding mode utilizes predictive differential coding to provide a precision which can be greater than that obtainable by coding information with the allotted number of bits, while the second coding mode assures at least a minimum precision for the allotted number of bits.

In the first coding mode, information to be transmitted is coded into a preselected combination of first and second digital words such that the average number of bits per word in the combination is not greater than the allotted number of bits. Each first digital word has more than the allotted number of bits, while each second digital word, formed using predictive differential coding, has less than the allotted number of bits. The first coding mode is transmitted as long as it provides a preselected precision. If this preselected precision is not provided, the second coding mode is transmitted. In the second coding mode, information to be transmitted is coded into third digital words each having not more than the allotted number of bits.

DETAILED DESCRIPTION

Figure 1:
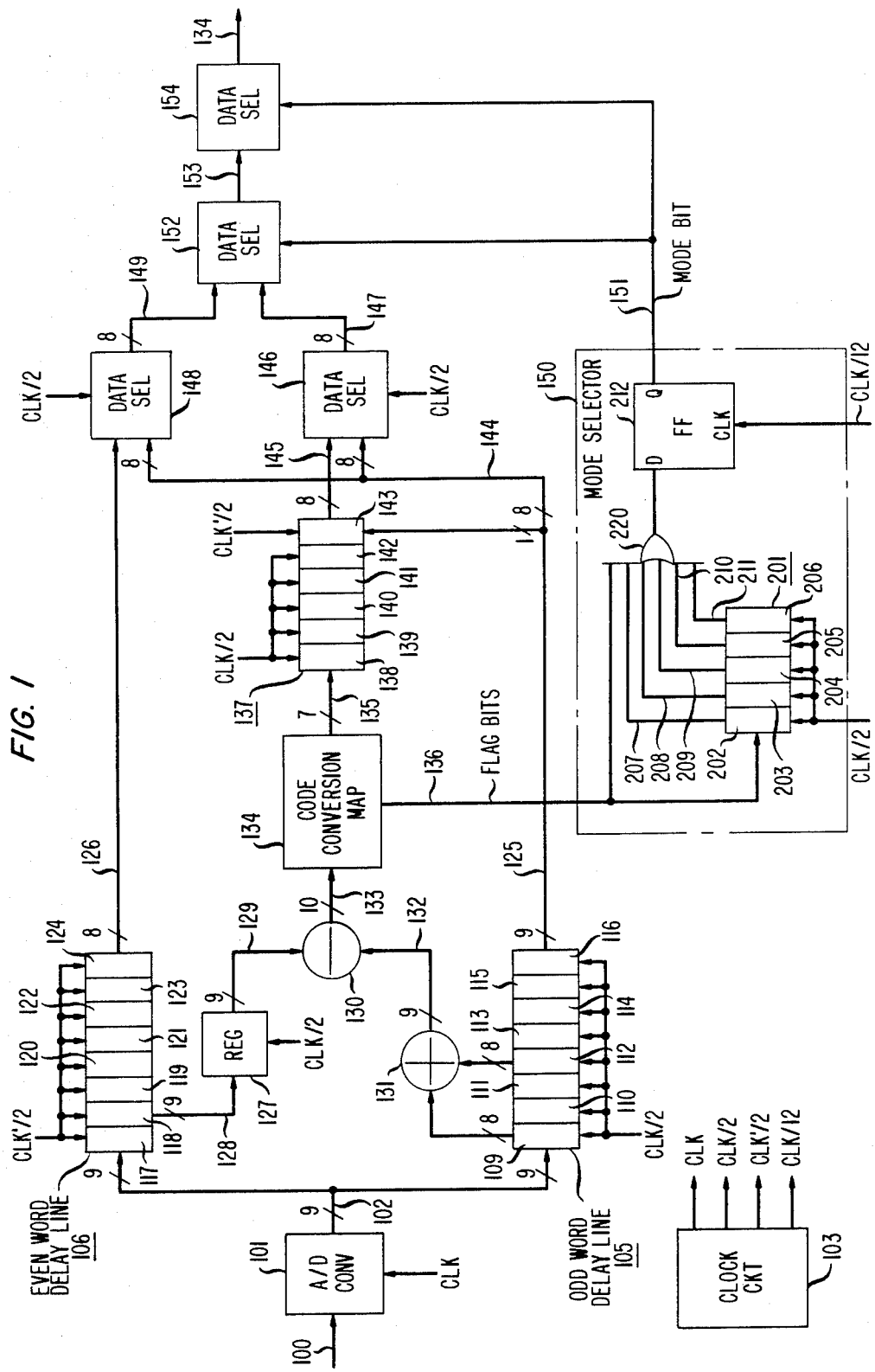
FIG. 1 is a block schematic diagram of an illustrative dual mode encoder in accordance with the present invention.

FIG. 1 shows a dual mode encoder comprising an input lead 100 to which an analog composite color video signal, such as that specified by the National Television Standards Committee (NTSC), is supplied and an output lead 134 to which a train of digitally encoded words representing the video signal is coupled. Lead 134 is connected to a PCM digital transmission facility having an available channel capacity of approximately 90 megabits/second. For video signal encoding, the sampling frequency is preferably three times the subcarrier frequency or approximately 11 MHz. This sampling frequency "freezes" the effects of certain signal impairments to provide better video transmission. Based on the preferable sampling frequency and available capacity, the allotted number of bits per digital word is the largest integer in 90/11 or 8. That is, the allotted number of bits per digital word is defined as the largest integer resulting from the division of the available channel capacity by the sampling frequency. In this system application, however, 9 bits/digital word precision or quality is desired.

To provide improved quality within the allotted 8 bits/digital word, the encoder codes video signal samples into two coding modes. Depending on the precision obtained, one of the modes is selected for transmission. This mode selection is made for every 12 consecutive video signal samples.

In the first coding mode, the video signal is represented by alternating first and second digital words. Each first digital word is 9-bit PCM coded while each second digital word is 7-bit DPCM (differential pulse code modulation) coded. Each 7-bit DPCM word represents the difference between a 9-bit PCM encoded video signal sample and a prediction. The first mode is transmitted as long as the prediction error can be coded with 7 bits without degrading the video quality below a preselected threshold. This threshold can be 9-bit quality or, as will be described, can be 8-bit quality. If the preselected quality threshold cannot be met, the second mode is transmitted. In the second mode, the video signal is represented by third digital words. Each third digital word is 8-bit PCM coded to assure a minimum of 8-bit quality.

Referring to FIG. 1, analog-to-digital (A/D) converter 101 samples the color video signal on every CLK pulse. Each sample is encoded into a 9 bit PCM word which appears across the nine leads of bus 102. The CLK pulses are generated by clock circuit 103 and have a frequency equal to three times the subcarrier frequency. Clock circuit 103 also generates CLK/2, CLK'/2 and CLK/12 which are clocking signals used by other circuitry in the encoder.

Bus 102 couples the 9 bit PCM words to odd word delay line 105 and even word delay line 106. Odd word delay line 105 and even word delay line 106 respectively comprise eight serially connected, parallel-in, parallel-out shift registers 109–116 and 117–124. Each shift register in delay line 105 is clocked by CLK/2 while each shift register in delay line 106 is clocked by CLK'/2. CLK/2 and CLK'/2 are complementary clock signals which occur at one-half the CLK frequency with the CLK/2 pulses leading the CLK'/2 pulses by one CLK period. Accordingly, sequentially numbering the 9-bit PCM words generated by converter 101, the odd-numbered words are clocked into delay line 105 and the even-numbered words are clocked into delay line 106. With each CLK/2 pulse, the odd-numbered words stored in delay line 105 shift one register to the right and the most recently generated odd-numbered word is clocked into register 109. After a delay of 8 CLK/2 periods, each odd-numbered word stored in register 109 is read out from register 116 and appears across the nine leads of bus 125. The eight leads of bus 125 carrying the eight most significant bits are connected to the eight leads of bus 144. As a result, odd-numbered, 8-bit PCM words are formed on bus 144. With each CLK'/2 pulse, the even-numbered words stored in delay line 106 shift one register to the right and the most recently generated even-numbered word is clocked into register 117. After a delay of 8 CLK'/2 periods, the eight most significant bits of each even-numbered word are read out from register 124 onto the eight leads of bus 126. By not reading out the least significant or ninth bit of each even-numbered word in register 124, even-numbered, 8-bit PCM words are formed on bus 126. The 8-bit PCM words on busses 144 and 126 form the second coding mode of the analog video signal.

In the first mode, the odd-numbered 9-bit PCM words on bus 125 are used. However, to avoid exceeding the available channel capacity, a 7-bit DPCM word is generated in the first coding mode in lieu of each even-numbered, 9-bit PCM word. Each 7-bit DPCM word represents the prediction error, i.e., the difference between an even-numbered, 9-bit PCM word and a corresponding prediction. While the prediction can be related to neighboring digital words in a number of ways, the disclosed embodiment advantageously forms a well-correlated prediction for each even-numbered, 9-bit PCM word by linear interpolation. Specifically, for any given even-numbered word, the 3rd prior 9-bit PCM word and the 3rd succeeding 9-bit PCM word are averaged.

To generate the 7-bit DPCM words, each even-numbered, 9-bit PCM word clocked into register 118 on a CLK'/2 pulse is coupled via bus 128 to 9-bit parallel-in, parallel-out shift register 127. The contents of bus 128 are written into register 127 on the succeeding CLK/2 pulse and are read out on bus 129. Adder 131 forms twice the prediction for each even-numbered, 9-bit PCM word by digitally adding the eight most significant bits in registers 109 and 112. Bus 132 is coupled to the output terminals of adder 131 in a well-known manner which divides the summed bits by two. Subtractor 130 then digitally subtracts the prediction on bus 132 from each even-numbered, 9-bit PCM word on bus 129 to provide a 10-bit prediction error on bus 133.

Code conversion map 134 comprises a memory which, when addressed by each 10-bit prediction error on bus 133, reads out a 7-bit DPCM word on bus 135 and an associated flag bit on lead 136. This conversion of the 10-bit prediction error into a 7-bit DPCM word provides 9-bit quality so long as the 10-bit prediction error can be represented by 7 bits without introducing any quantization error. This is true for a 1-to-1 relationship between prediction error and 7-bit DPCM word. Consequently, for the $2^{10}$ or 1,024 possible 10-bit prediction errors, $2^7$ or 128 prediction errors can be converted into a 7-bit DPCM word without degrading the video quality below 9 bits. These 128 prediction errors should preferably be the most likely prediction errors. For well-correlated predictions, the 128 most-likely prediction errors are the 128 prediction errors lowest in magnitude including zero. For the selected 128 prediction errors, the flag bit read out is logical "0" to indicate that 9-bit quality results from the 10- to 7-bit conversion. For the remaining 896 prediction errors, the flag bit read out is logical "1". The logical level of the flag bits, as described hereinafter, will be used to determine which coding mode is transmitted.

While the above-described 10- to 7-bit conversion is satisfactory, in the disclosed video application, map 134 preferably utilizes companding in the conversion of 10-bit prediction errors into 7-bit DPCM words. While this companding increases the probability that the first coding mode is transmitted, when larger prediction errors are companded into a 7-bit DPCM word, the first coding mode provides less than 9-bit quality. However, considering that the second mode only provides 8-bit video quality, it has been deemed desirable to transmit the first coding mode so long as the resulting quality is not less than 8 bits. In the companding selected, 256 prediction errors are converted into 7-bit DPCM words having logical "0" flag bits while the remaining 768 prediction errors are associated with a logical "1" flag bit. More particularly, each of the 32 smallest positive prediction errors, including zero error, and each of the 32 smallest negative prediction errors are encoded into a different 7-bit DPCM word and logical "0" flag bit. These 64 prediction errors, on average, are the most likely and the 64 corresponding 7-bit DPCM words provide 9-bit quality. The next 96 positive and 96 negative prediction errors are compressed 3-to -1, i.e., each group of 3 prediction errors closest in magnitude are quantized into a single 7-bit DPCM word and a logical "0" flag bit. This 3-to-1 compression provides 8-bit quality. Consequently, at times, the first mode provides 9-bit quality while in no event is the quality less than 8 bits. With companding, a logical "0" or "1" flag bit respectively indicates at least 8-bit quality or less than 8-bit quality is provided by the associated 7-bit DPCM word.

Mode selector 150 determines which coding mode is transmitted to represent every 12 consecutive video samples. Each determination is made by examining 6 successive flag bits on lead 136 and results in the generation of a mode bit on lead 151. Mode selector 150 comprises shift register 201, OR gate 220 and D-type flip-flop 212. Register 201, comprising cells 202 through 206 which are clocked by CLK/2, stores 5 consecutive flag bits. OR gate 220 is supplied with the 5 consecutive flag bits in register 201 via leads 207 through 211 along with the flag bit on lead 136. The logical OR output of gate 220 is supplied to flip-flop 212 which clocks the same onto lead 151 on the occurrence of a CLK/12 pulse. Hence, if all 6 consecutive flag bits are logical "0", a logical "0" mode bit is generated on lead 151 to indicate the first mode should be transmitted. If, however, one or more of the 6 consecutive flag bits are logical "1", the mode bit is logical "1" to indicate the second mode should be transmitted.

During the time that the mode determination is made, appropriate delay of the 7-bit DPCM words is provided by delay line 137. Delay line 137 comprises six parallel-in, parallel-out shift registers 138–143. Registers 138–142, clocked by CLK/2, receive and shift seven bits while register 143 is clocked by CLK'/2 and shifts eight bits. The extra bit received and shifted by register 143 is the least significant or $9^{th}$ bit from each odd-numbered PCM word on bus 125. Coupling of the least significant bit from bus 125 to register 143 advantageously generates the odd-numbered, 8-bit PCM words of the second coding mode on bus 144. In addition, this bit coupling preferably provides 8-bit words in either the first or second mode so that the mode transmitted does not affect the digital facility terminal equipment.

The first coding mode appears on busses 144 and 145. Bus 144 contains the eight most significant bits of each odd-numbered, 9-bit PCM word while bus 145 contains each 7-bit DPCM word and the least significant bit of each odd-numbered, 9-bit PCM word. Data selector 146, controlled by the logic level of CLK/2, switches between busses 144 and 145 to multiplex the first coding mode onto bus 147. On bus 147, each 8-bit word from bus 144 is followed by an 8-bit word from bus 145.

Data selector 148, controlled by the logic level of CLK/2, switches between the digital words in the second coding mode on busses 126 and 144. As a result, the second coding mode is multiplexed onto bus 149. On bus 149, each odd-numbered, 8-bit PCM word precedes the following even-numbered, 8-bit PCM word.

Data selector 152, in response to each logical "0" mode bit, serializes each 8-bit word in the first coding mode onto lead 153 and, in response to each logical "1" mode bit, serializes each 8-bit word in the second coding mode onto lead 153. In the serialization of the first coding mode, the least significant or $9^{th}$ bit of every odd-numbered, 9-bit PCM word appears as the $8^{th}$ bit of the immediately following even-numbered word.

Decoding and regeneration of the video signal in the receiver requires knowledge of which coding mode is transmitted. Accordingly, data selector 154 multiplexes each mode bit on lead 151 and the associated twelve 8-bit words on lead 153 into a serial output on lead 134. The information on lead 134 can be transmitted over a variety of digital facilities. If desired, framing and parity bits can be added. Of course, each mode can be identified by more than one bit or by an identifiable transmitted signal.

Figure 2:
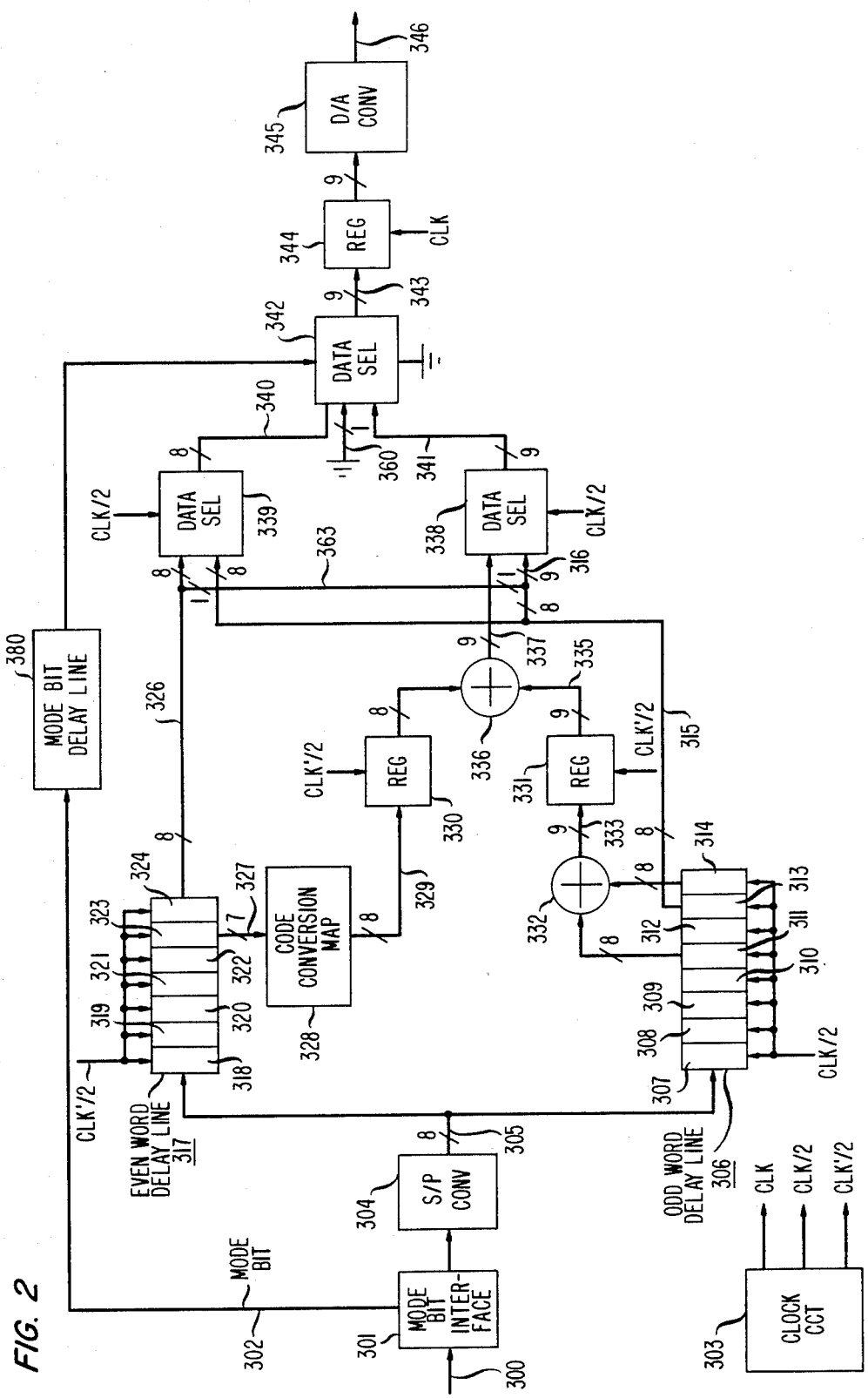
FIG. 2 is an illustrative dual mode decoder in accordance with the present invention.

Refer now to FIG. 2 which shows a dual mode decoder for regenerating the analog video signal. After propagation through a digital facility, the coded video signal is coupled to lead 300. Mode bit interface 301 gates each mode bit to lead 302 and passes the associated 12 eight-bit words to serial-to-parallel converter 304. Converter 304 generates 8-bit digital words on bus 305 by converting every 8 consecutive bits into a parallel output.

Odd word delay line 306 and even word delay line 317, respectively clocked by CLK/2 and CLK'/2, are connected to bus 305. Clock circuit 303 generates the CLK/2, CLK'/2 and CLK signals. Odd word delay line 306 and even word delay line 317, respectively, comprise serially connected, 8-bit parallel-in, parallel-out shift registers 307 through 314 and 318 through 324. Therefore, sequentially numbering the 8-bit words formed by converter 304, the odd-numbered words are clocked into delay line 306 and the parallel output of register 313 subsequently appears on bus 315 while the even-numbered are clocked into delay line 317 and the parallel output of register 324 subsequently appears on bus 326.

The digital words in delay lines 306 and 317 can represent either first or second mode coded information. If the incoming digital words on lead 300 were second mode coded, the odd-numbered, 8-bit PCM words appear on bus 315 and the even-numbered, 8-bit PCM words appear on bus 326. However, if the incoming digital words on lead 300 were first mode coded, further processing is required to first compose the alternating first mode pattern of 9-bit PCM and 7-bit DPCM words and then reconstruct the 9-bit PCM word represented by each 7-bit DPCM word.

The decoder initially assumes all incoming information is first mode coded. Odd-numbered, 9-bit PCM words are reconstructed on bus 316 by adding the least significant or $8^{th}$ bit on bus 326 via lead 363 to the 8 bits of every odd-numbered word on bus 315. To regenerate the even-numbered, 9-bit PCM words, the predictions used in the encoder are formed on bus 333 by adding the contents of registers 311 and 314 using digital adder 332. In addition, the seven most significant bits of every word stored in register 323, which represent a 7-bit DPCM word in the first mode, are coupled via bus 327 to code conversion map 328.

Map 328 provides an 8-bit word for every 7-bit address. If the first mode was transmitted, each 7-bit address is a 7-bit DPCM word and each 8-bit word is the corresponding prediction error. If companding is not used, as described hereinabove, map 328 provides the corresponding one of the 128 prediction errors for each 7-bit DPCM word address. If companding is used, as described hereinabove, map 328 provides the corresponding one of the 64 prediction errors which are not compressed or the middlemost of each group of 3 consecutive prediction errors which are compressed 3-to-1 for each 7-bit DPCM word address. If the second mode is transmitted, the 8-bit word provided by map 328 is inconsequential as it will not be used for regenerating the analog video signal.

Each 8-bit prediction error on bus 329 and the associated 9-bit prediction on bus 333 are synchronized using CLK'/2 via shift register 330 and 331. Digital adder 336 then generates 9-bit words on bus 337 by adding each 8-bit prediction error to the associated 9-bit prediction. When the incoming information is first mode coded, the 9-bit words on bus 337 represent the even-numbered, 9-bit PCM words formed by A/D converter 101.

Data selector 338, controlled by the logical level of CLK/2, switches between busses 316 and 337 to generate a series of 9-bit digital words on bus 341. Bus 316 is switched to the output of selector 338 on the logical "0" or later half of the CLK/2 clock period when ninth bit from bus 326 is present. Each time the first coding is received, the series on bus 341 comprises twelve 9-bit PCM words which sequentially represent twelve consecutively coded video signal samples.

Data selector 339, controlled by the logical level of CLK/2, switches between busses 315 and 326 to generates a series of eight-bit words on bus 340. Each time the second coding mode is received, this series on bus 340 comprises twelve 8-bit PCM words which sequentially represent twelve consecutively coded video signal samples.

Data selector 342 couples the first mode coded information on bus 341 to bus 343 for each logical "0" mode bit and couples the second mode coded information on bus 340 to bus 343 for each logical "1" mode bit. Mode bit delay line 380 delays the mode bit by an appropriate time interval to insure switching of selector 342 at the beginning of a coding mode. For symmetrical data selector operation, the digital words on bus 340 are converted to 9-bit words having a logical 37 0" ninth bit by coupling grounded lead 360 along with bus 340 to data selector 342. The contents of bus 343 are coupled through register 344 where they are stored and read out on each CLK pulse. Finally, the output of register 344 is coupled to D/A converter 345 which regenerates the transmitted analog video signal on lead 346.

It is to be understood that the above-described arrangements are merely illustrative of the numerous other arrangements which may constitute applications of the principles of the invention. Such other arrangements and modifications may readily be devised by those skilled in the art without departing from the spirit and scope of this invention. First, for example, any analog or digital input signal may be used with appropriately formed predictions. Second, the invention is not limited to PCM coded words but is applicable to a variety of coded representations. Third, while the mode determination is made in the disclosed embodiment for every twelve digital words, this number may be increased or decreased by suitable adjustment of the delay lines. Fourth, the first coding mode is not limited to alternating 9-bit PCM and 7-bit DPCM words. Any preselected combination of first and second words may be used as long as the average number of bits per first mode word is not greater than the allotted number of bits. Similarly, in the second mode, the input signal can be represented by a variety of third digital words as long as the number of bits for each third word is not greater than the allotted number of bits.

What is claimed is:

1. Apparatus of use in a digital transmission system wherein transmitted digital words are limited on average to an allotted number of bits, said apparatus comprising
   first means for encoding an input signal into a preselected combination of alternate first and second digital words such that the average number of bits per word in said combination is not greater than said allotted number of bits, each of said first digital words having more than said allotted number of bits and each of said second digital words being formed using predictive differential coding and having less than said allotted number of bits;
   second means for encoding said input signal into third digital words each having said allotted number of bits;
   means for determining the precision provided by said preselected combination relative to a preselected threshold;
   means responsive to a first result of said precision determination for forming a first output comprising said preselected combination; and
   means responsive to a second result of said precision determination for forming an alternate output comprising said third digital words.

2. The apparatus of claim 1 wherein the average number of bits per word in said combination is equal to said allotted number of bits.

3. The apparatus of claim 2 wherein said preselected combination in said first output is arranged into output words each having the allotted number of bits.

4. The apparatus of claims 1, 2, or 3 wherein said first output further comprises at least one bit identifying said first output and said alternate output further comprises at least one bit identifying said alternate output.

5. The apparatus of claim 1 wherein said second digital words are formed using linear interpolated predictions.

6. The apparatus of claim 5 wherein each of said linear interpolated predictions is formed from selected ones of said first digital words.

7. The apparatus of claim 6 wherein each of said second digital words represents said input signal at a given time and said selected ones of said first digital words represents said input signal at times before and after said given time.

8. Apparatus for use in a digital transmission system wherein either a first signal or a second signal is transmitted and transmitted digital words are limited on average to an allotted number of bits, said apparatus comprising
   first means responsive to said first signal for generating an output signal by decoding a preselected combination of alternate first and second digital words, the average number of bits per word in said preselected combination being not greater than said allotted number of bits, each of said first digital words having more than said allotted number of bits, each of said second digital words having less than said allotted number of bits and being formed using predictive differential coding; and
   second means responsive to said second signal for generating said output signal by decoding third digital words each having said allotted number of bits.

9. The apparatus of claim 8 wherein the average number of bits per word in said combination is equal to said allotted number of bits.

10. The apparatus of claim 9 wherein said preselected combination is arranged into incoming digital words each having said allotted number of bits.

11. The apparatus of claim 10 wherein said first means decodes said second digital words by regenerating linear interpolated predictions.

12. The apparatus of claim 11 wherein each of said linear interpolated predictions is formed from selected ones of said first digital words.

13. The apparatus of claim 12 wherein each of said second digital words is received at a given time and said selected ones of said first digital words are received at times before and after said given time.

14. Apparatus for use in a digital transmission system wherein transmitted digital words are limited on average to an allotted number of bits, said apparatus comprising
   means for forming first digital PCM words representing information to be transmitted, each of said first digital words having more than said allotted number of bits;
   means for forming second digital words using predictive differential coding to represent selected ones of said first digital words, each of said second digital words having less than said allotted number of bits;
   means for determining the precision provided by said second digital words relative to a preselected threshold;
   means responsive to a first result of said precision determination for a forming an output of said apparatus comprising an alternating of nonselected ones of said first digital words and said second digital words such that the average number of bits per output word is not greater than said allotted number of bits; and
   means responsive to a second result of said precision determination for forming an alternate output of said apparatus comprising said allotted number of bits from each of said first digital words.

15. A digital transmission system comprising a transmitter and a receiver which respectively encode and decode digital words which are limited on an average to an allotted number of bits, said system comprising first transmitter means for encoding an input signal into a preselected combination of alternate first and second digital words such that the average number of bits per word in said combination is not greater than said allotted number of bits, each of said first digital words being PCM encoded and having more than said allotted number of bits and each of said second digital words being formed using predictive differential coding and having less than said allotted number of bits;

second transmitter means for encoding said input signal into third digital words each having said allotted number of bits and being PCM encoded;

third transmitter means for determining the precision provided by said preselected combination relative to a preselected threshold;

fourth transmitter means responsive to a first result of said precision determination for forming a first output comprising said preselected combination and a first output identifying signal;

fifth transmitter means responsive to a second result of said precision determination for forming an alternate output comprising said third digital words and an alternate output identifying signal;

first receiver means responsive to said first output identifying signal for regenerating said input signal by decoding said preselected combination; and second means responsive to said alternate output identifying signal for regenerating said input signal by decoding said third digital words.

16. A method of improving the precision provided by transmitted digital words which are limited on average to an allotted number of bits, said method comprising coding an input signal into a preselected combination of alternating first and second digital words such that the average number of bits per word in said combination is not greater than said allotted number of bits, each of said first digital words having more than said allotted number of bits and being formed by PCM encoding, each of said second digital words being formed using predictive differential coding and having less than said allotted number of bits;

coding said input signal into third digital words each having said allotted number of bits and being PCM encoded;

determining the precision provided by said preselected combination relative to a threshold;

transmitting said preselected combination if a first result of said precision determination is obtained; and transmitting said third digital words in lieu of said preselected combination if a second result of said precision determination is obtained.

17. In a transmission system, a transmission facility having a capacity able to transmit a given number of n-bit channels or words in a time division multiplex manner, means for encoding an input signal into first and second digital words, each of said first digital words being formed by pulse code modulation coding and having $n+1$ bits each, each of said second digital words being formed by predictive differential coding and having $n-1$ bits each, means for transmitting said first and second digital words alternately so that the number of bits per transmitted word over a given period averages out to n bits, means for forming from the input signal third digital words, said third digital words being formed in accordance with pulse code modulation coding and having n bits each, means for determining the precision provided by said differential coding relative to a preselected precision threshold, and means responsive to the determining means for transmitting said third digital words when the precision provided by said predictive coding falls below the preselected precision threshold.

18. A transmission system as defined in claim 17 wherein $n=8$.

* * * * *